United States Patent
Berger

(10) Patent No.: US 8,894,545 B2
(45) Date of Patent: Nov. 25, 2014

(54) HYDRAULIC CONTROL SYSTEM FOR AN AUTOMATIC TRANSMISSION HAVING ANALOG ELECTRONIC TRANSMISSION RANGE SELECTION

(71) Applicant: GM Global Technology Operations LLC, Detroit, MI (US)

(72) Inventor: Todd R. Berger, Pinckney, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 36 days.

(21) Appl. No.: 13/875,523

(22) Filed: May 2, 2013

(65) Prior Publication Data

US 2013/0319155 A1    Dec. 5, 2013

Related U.S. Application Data

(60) Provisional application No. 61/652,770, filed on May 29, 2012.

(51) Int. Cl.
- F16H 61/00    (2006.01)
- F16H 63/40    (2006.01)
- F16H 59/08    (2006.01)

(52) U.S. Cl.
USPC .......................................... 477/125; 475/130

(58) Field of Classification Search
USPC .......... 475/116, 127, 130, 131; 477/125, 158, 477/162; 74/473.11
See application file for complete search history.

(56) References Cited

U.S. PATENT DOCUMENTS

| | | | | |
|---|---|---|---|---|
| 3,610,004 A | * | 10/1971 | Neese | 70/218 |
| 3,618,634 A | * | 11/1971 | Nelson | 137/624.27 |
| 4,265,144 A | * | 5/1981 | Clark | 475/130 |
| 2004/0261559 A1 | * | 12/2004 | Ozaki et al. | 74/473.12 |
| 2010/0294066 A1 | * | 11/2010 | Itazu et al. | 74/473.12 |
| 2011/0314942 A1 | * | 12/2011 | Yonezu et al. | 74/473.3 |
| 2011/0314945 A1 | * | 12/2011 | Brandenburg et al. | 74/473.11 |
| 2014/0190784 A1 | * | 7/2014 | Yokota et al. | 192/219.5 |

* cited by examiner

Primary Examiner — Roger Pang

(57) ABSTRACT

A hydraulic control system for a transmission includes a source of pressurized hydraulic fluid that communicates with an electronic transmission range selection (ETRS) subsystem. The ETRS subsystem includes an ETRS valve, a park mechanism, a mode valve, a latch valve assembly, and a plurality of solenoids. The ETRS subsystem is configured to provide desired operating conditions during a plurality of potential failure conditions.

20 Claims, 3 Drawing Sheets

HYDRAULIC CONTROL SYSTEM FOR AN AUTOMATIC TRANSMISSION HAVING ANALOG ELECTRONIC TRANSMISSION RANGE SELECTION

CROSS-REFERENCE TO RELATED APPLICATIONS

This application claims the benefit of U.S. Provisional Application No. 61/652,770 filed May 29, 2012. The disclosure of the above application is incorporated herein by reference.

TECHNICAL FIELD

The invention relates to a control system for an automatic transmission, and more particularly to an electro-hydraulic control system having analog electronic transmission range selection.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The hydraulic control system includes a source of pressurized hydraulic fluid that communicates with an analog electronic transmission range selection (ETRS) subsystem. The ETRS subsystem includes an ETRS valve, a park servo, a park mechanism, a mode valve, and a plurality of solenoids.

In one example, the transmission includes a Park mode and an Out of Park mode of operation and has a plurality of torque transmitting devices selectively engageable to provide at least one forward speed ratio and at least one reverse speed ratio when in the Out of Park mode of operation. The hydraulic control system includes a pressure regulator subsystem for providing a pressurized hydraulic fluid, a clutch actuator subsystem for selectively actuating the torque transmitting devices upon receipt of the pressurized hydraulic fluid, a manual valve assembly in downstream fluid communication with the pressure regulator subsystem and in upstream fluid communication with the clutch actuator subsystem, the manual valve assembly having a manual valve moveable between a Park position and an Out of Park position, a detent mechanism connected to the manual valve, wherein the detent mechanism detents the manual valve into the Out of Park position, a latch valve assembly in downstream fluid communication with the pressure regulator subsystem and the manual valve assembly, the latch valve assembly having a latch valve moveable between a Park position and an Out of Park position, a park servo in downstream fluid communication with the latch valve assembly and the manual valve assembly, and a park lock mechanism mechanically coupled to the park servo. The park servo mechanically moves the park lock mechanism to place the transmission in the Park condition when the manual valve and the latch valve are in the Park positions and wherein the park servo mechanically moves the park lock mechanism to place the transmission in the Out of Park condition when the manual valve and the latch valve are in the Out of Park positions.

In another example, the hydraulic control system further includes a first control device in downstream fluid communication with the pressure regulator subsystem and in upstream fluid communication with the manual valve assembly, wherein the first control device when opened communicates the pressurized hydraulic fluid to the manual valve assembly to move the manual valve to the Out of Park position.

In another example, the hydraulic control system further includes a second control device in downstream fluid communication with the pressure regulator subsystem and in upstream fluid communication with the manual valve assembly, wherein the second control device when opened communicates the pressurized hydraulic fluid to the manual valve assembly to move the manual valve to the Park position.

In another example, the hydraulic control system further includes a third control device mechanically coupled to the manual valve and the park servo, wherein the third control device when opened locks the manual valve and the park servo into the Out of Park positions.

In another example, the detent mechanism includes a ball biased towards the manual valve by a spring.

In another example, the manual valve includes a stem that extends out of the manual valve assembly, and the stem includes a slot that aligns with the detent mechanism when the manual valve is in the Out of Park position.

In another example, a sensor is connected to the manual valve for sensing a position of the manual valve.

In another example, the detent mechanism includes a ball selectively biased towards the manual valve by a hydraulically actuated piston.

In another example, the piston is in downstream fluid communication with the clutch actuator subsystem.

In another example, a stepper motor is interconnected to the manual valve and mechanically moves the manual valve between positions.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
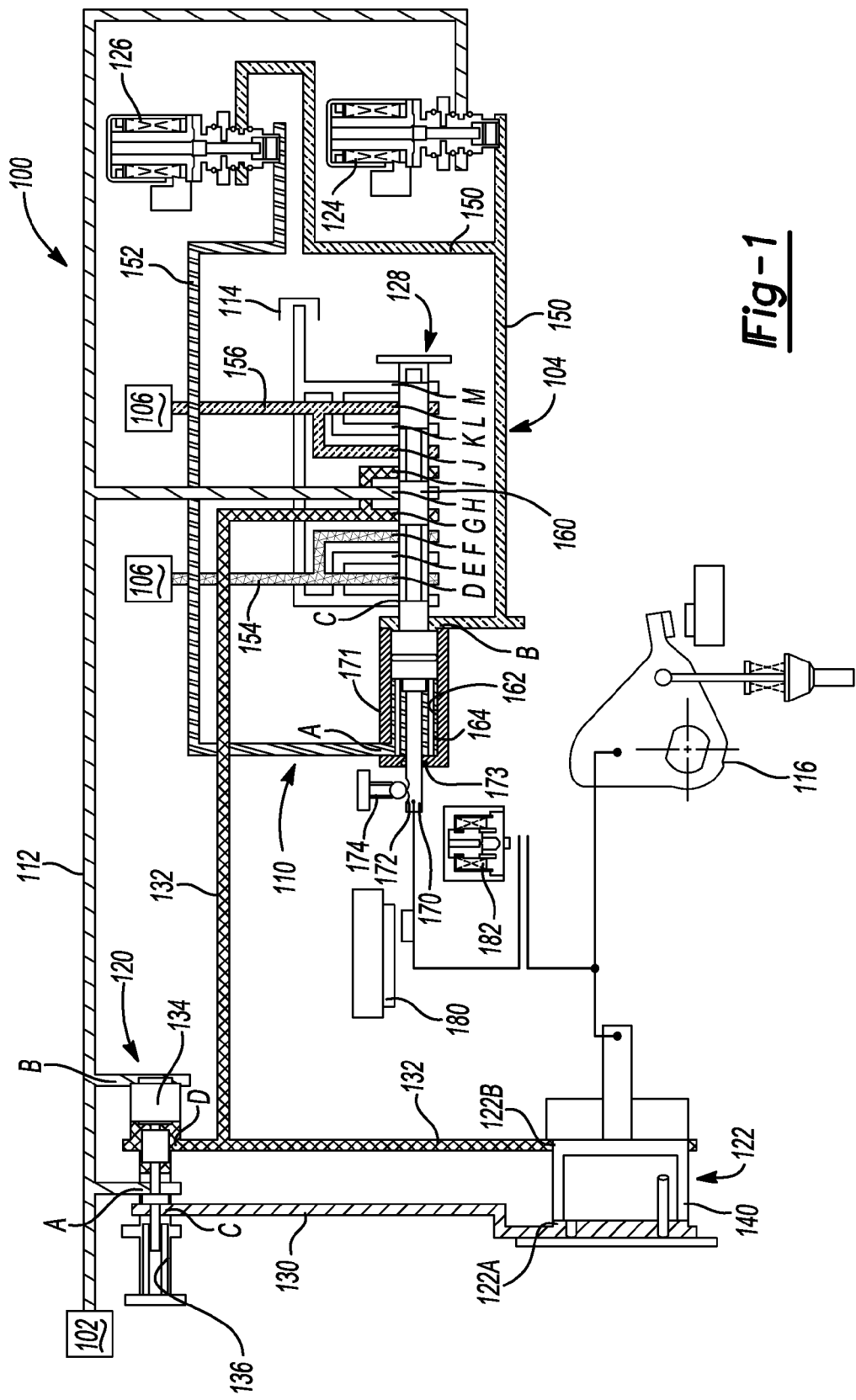
FIG. 1 is a diagram of a portion of a hydraulic control system according to the principles of the present invention.

With reference to FIG. 1, a portion of a hydraulic control system according to the principles of the present invention is generally indicated by reference number 100. The hydraulic control system 100 generally includes a plurality of interconnected or hydraulically communicating subsystems including a pressure regulator subsystem 102, a clutch control subsystem 106, and an electronic transmission range selection (ETRS) control subsystem 110. The hydraulic control system 100 may also include various other subsystems or modules, such as a lubrication subsystem, a torque converter clutch subsystem, and/or a cooling subsystem, without departing from the scope of the present invention.

The pressure regulator subsystem 102 is operable to provide and regulate pressurized hydraulic fluid, such as transmission oil, throughout the hydraulic control system 100. The pressure regulator subsystem 102 draws hydraulic fluid from a sump 114. The sump 114 is a tank or reservoir preferably disposed at the bottom of a transmission housing to which the hydraulic fluid returns and collects from various components and regions of the transmission. The hydraulic fluid is forced from the sump 114 and communicated throughout the hydraulic control system 100 via a pump (not shown). The pump is preferably driven by an engine (not shown) and may be, for example, a gear pump, a vane pump, a gerotor pump, or any other positive displacement pump. The pressure regulator subsystem 102 may also include an alternate source of hydraulic fluid that includes an auxiliary pump (not shown) preferably driven by an electric engine, battery, or other prime mover (not shown). The pressure regulator subsystem 102 feeds pressurized hydraulic fluid at line pressure to a main supply line 112.

The clutch control subsystem 106 provides hydraulic fluid to clutch actuators (not shown). The clutch actuators are hydraulically actuated pistons that each engage one of a plurality of torque transmitting devices to achieve various forward, or drive speed ratios and reverse speed ratios.

The ETRS control subsystem 110 connects the pressure regulator subsystem 102 with the clutch control subsystem 106. Generally, the ETRS control subsystem 110 converts electronic input for a requested range selection (Drive, Reverse, Park) into hydraulic and mechanical commands. The hydraulic commands use line pressure hydraulic fluid from the pressure regulator subsystem 102 via fluid line 112 to supply hydraulic fluid to the clutch actuator subsystem 106. The mechanical commands include engaging and disengaging a park mechanism 116. The ETRS control subsystem 110 includes a latching valve assembly 120, a park servo 122, a first and second control devices 124 and 126, and a mode valve assembly 128.

The latching valve assembly 120 includes ports 120A-D. Ports 120A and 120B are each connected to the main supply line 112. Port 120C communicates with a fluid line 130. Port 120D communicates with a fluid line 132. The latching valve assembly 120 further includes a spool 134 slidably disposed within a bore 136. The spool 134 is actuated to a stroked position or Park position and a de-stroked or out-of-Park position as will be described below.

Fluid lines 130 and 132 communicate with the Park servo 122. The Park servo 122 includes ports 122A and 122B each located on either side of a piston 140. The piston 140 is mechanically coupled to the park system 116. Port 122A communicates with fluid line 130 and port 122B communicates with fluid line 132. The piston 140 moves upon contact by the hydraulic fluid supplied by one of the fluid lines 130 and 132, thereby mechanically disengaging or engaging the Park system 116.

The first control device 124 is connected to the main supply line 112. The first control device 124 is preferably a variable pressure, normally low solenoid that selectively provides hydraulic fluid flow to a range control fluid line 150. The second control device 126 is connected to the range control fluid line 150. The second control device 126 is preferably a variable flow, normally low solenoid that selectively provides hydraulic fluid flow to a fluid line 152. The control devices 124 and 126 are operable to selectively actuate the mode valve assembly 128 as will be described in greater detail below.

The mode valve assembly 128 includes ports 128A-M, labeled sequentially in FIG. 1 from left to right. Port 128A is in communication with the fluid line 152. Port 128B is in communication with the range control fluid line 150. Ports 128C, E, K, and M are exhaust ports in communication with the sump 114. Fluid ports 128D and F are in communication with a Reverse supply line 154. The Reverse supply line 154 communicates with the clutch actuation subsystem 106 and more particularly to a Reverse circuit that supplies fluid to the clutches needed to engage Reverse. Ports 128G and I are in communication with fluid line 132. Port 128H is in communication with the main supply line 112. Ports 128J and L are in communication with a Drive supply line 156. The Drive supply line 156 communicates with the clutch actuation subsystem 106 and more particularly to a Drive circuit that supplies fluid to the clutches needed to engage the forward speed or gear ratios.

The mode valve assembly 128 further includes a spool 160 slidably disposed within a bore 162. The spool 160 is actuated by the control devices 124 and 126 and by a spring 164. For example, when control device 124 is opened, fluid from the range control line 150 communicates through port 128B and moves the spool 160 against the bias of the spring 164 (i.e. stroked to the left). The spool 160 may be selectively moved into various positions by opening the control device 126 which moves the spool 160 to the right (i.e. de-strokes the spool 160). Movement of the spool 160 allows selective communication between the ports 128C-M.

For example, in a Park condition, the spool 160 is fully de-stroked and port 128H, which provides the hydraulic fluid at line pressure, is closed. In addition, ports 128D, F, I, and J communicate with the exhaust ports, thereby exhausting the clutch actuation subsystem 106 as well as fluid line 132. With fluid line 132 exhausted, the latching valve 134 strokes and allows fluid port 120A to communicate with fluid port 120C. Hydraulic fluid at line pressure communicates through port 120A to port 120C and into port 122A of the Park servo which in turn strokes the piston 140 and engages the Park mechanism 116. In a Drive condition, the spool 160 is stroked and hydraulic fluid at line pressure from port 128H communicates with ports 128I and J, thereby providing pressurized hydraulic fluid to the drive circuits of the clutch actuation subsystem 106 as well as to line 132. Fluid in line 132 allows the latching valve 134 to de-stroke cutting off the fluid line 130 while providing fluid to port 122B of the Park servo. Fluid at port 122B in turn strokes the piston 140 and moves the Park mechanism 116 out of engagement. Likewise, with the spool 160 fully stroked, hydraulic fluid at line pressure from port 128H communicates with port 128F and G, thereby providing pressurized hydraulic fluid to the Reverse circuits of the clutch actuation subsystem 106 as well as to line 132.

The spool 160 further includes a stem 170 that includes a slot 172 for receiving a detent mechanism 174. The stem 170 extends out from a housing 171 and is preferably sealed to the housing 171 by ring seals 173. The detent mechanism 174 provides a mechanical bias when engaged in the slot 172 and allows the spool 160 to hold its position even if the pressure supplied by the control devices 124 or 126 is reduced. The stem 170 is interconnected with a position sensor 180 that is operable to detect the position of the spool 160.

Both the spool 160 and the Park mechanism 116 are connected with an out-of-Park (OOP) solenoid 182. The OOP solenoid 182 is actuatable to mechanically prevent the spool 160 from stroking and to prevent the Park mechanism 116 from engaging during an engine stop-start event (i.e. when the vehicle is intended to be mobile during an automatic engine stop).

Figure 2:
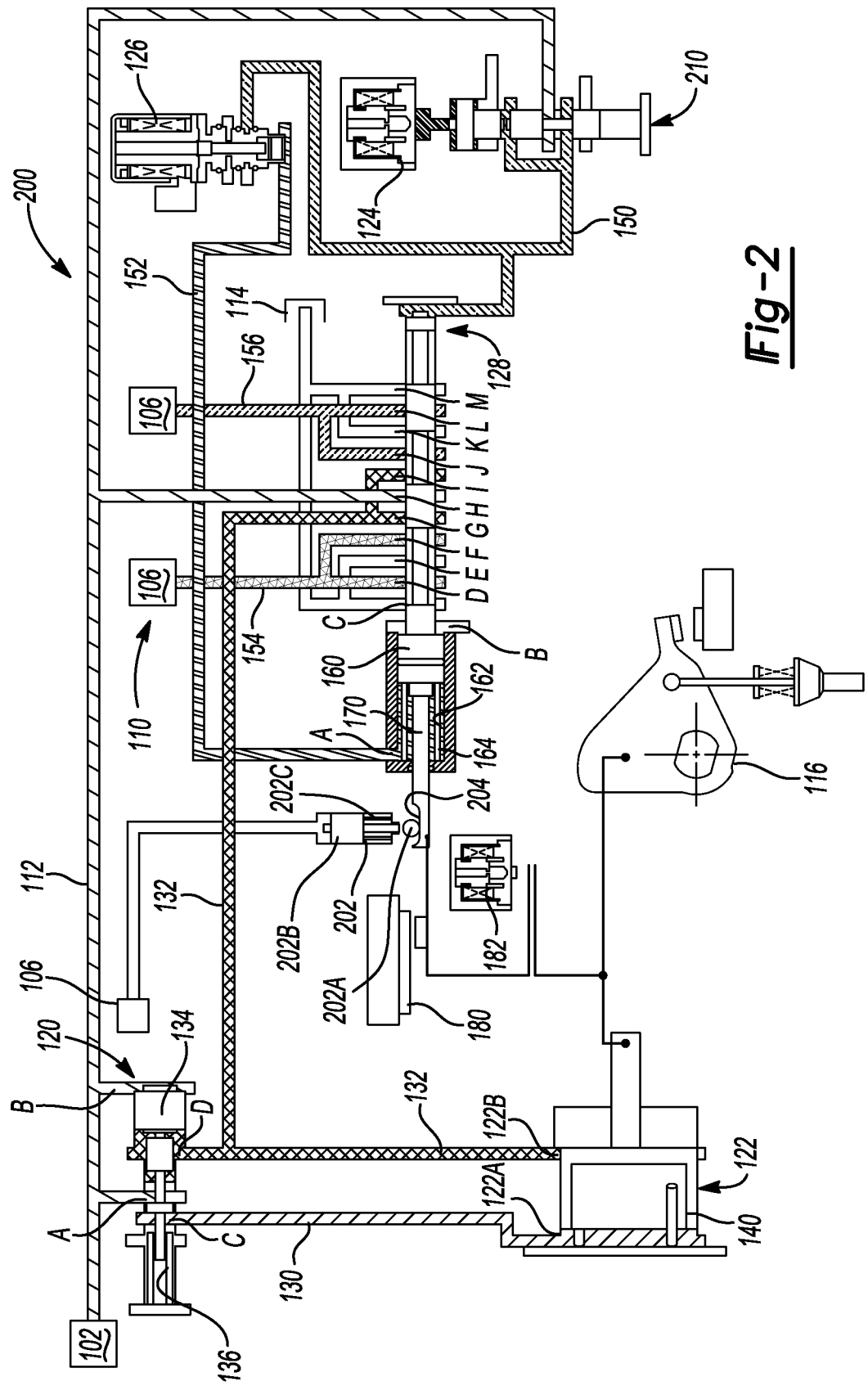
FIG. 2 is a diagram of another embodiment of a portion of a hydraulic control system according to the principles of the present invention.

Turning to FIG. 2, another embodiment of the hydraulic control system is generally indicated by reference number 200. The hydraulic control system 200 is similar to the hydraulic control system 100 shown in FIG. 1 and like components are indicated by like reference numbers. However, the latching mechanism 174 shown in FIG. 1 has been replaced by a hydraulic latch 202. The hydraulic latch 202 includes a ball 202A that is selectively biased towards the manual valve 160 by a hydraulically actuated piston 202B. A biasing member 202C biases the piston 202B away from the manual valve 160. The hydraulic latch 202 interacts with a slot 204 located in the stem 170 of the spool 160. The hydraulic latch 202 is biased towards the manual valve 160 by pressurized hydraulic fluid multiplexed to one of the plurality of torque transmitting mechanisms in the clutch control subsystem 106. Therefore, when one of the clutches is engaged thereby indicated an Out of Park or Drive condition, the hydraulic latch 202 is engaged and the spool 160 is restricted in movement to the length of the slot 204. In addition, the control device 124 may be connected with a valve assembly 210 that regulates fluid flow to the range control fluid line 150.

Figure 3:
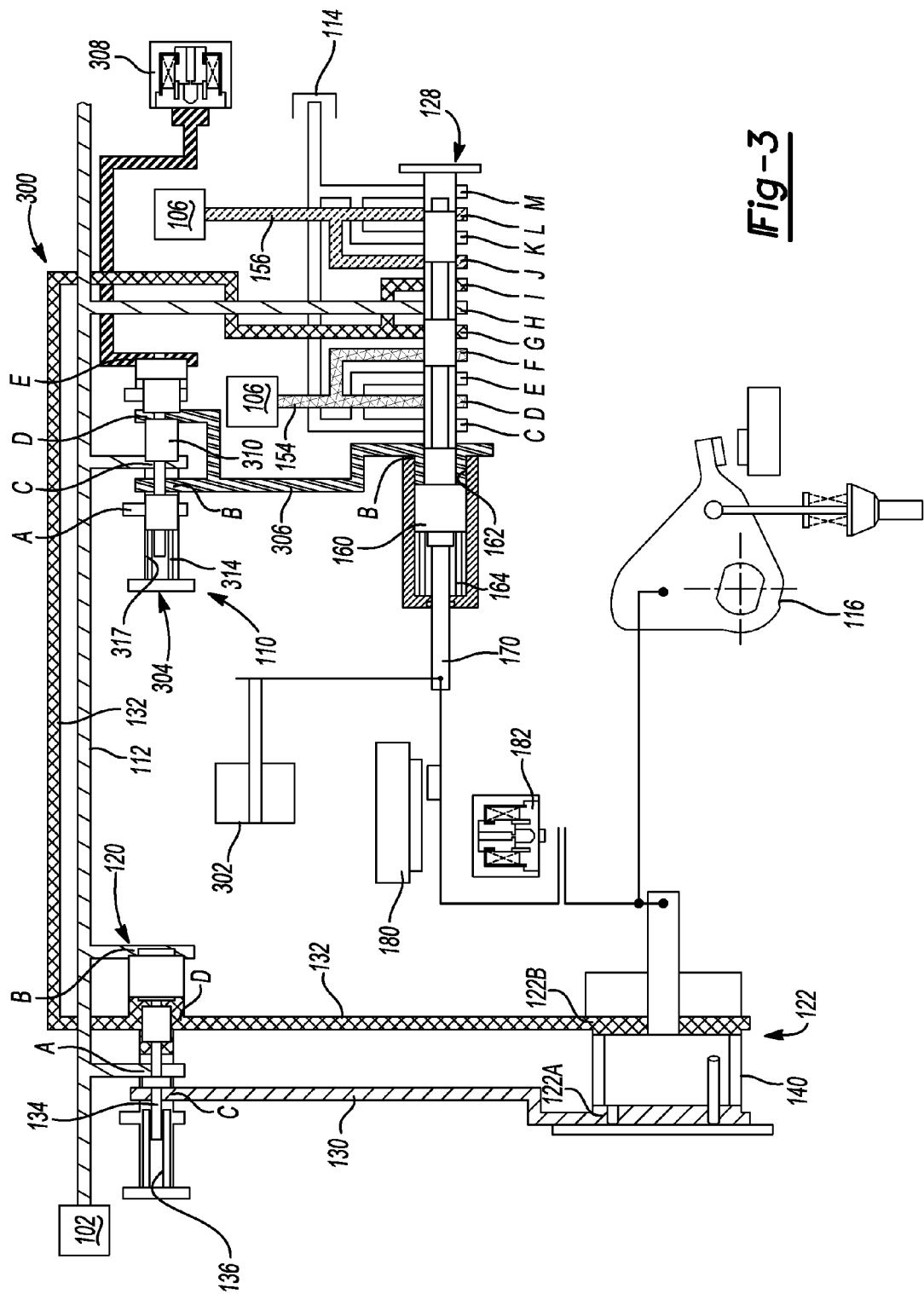
FIG. 3 is a diagram of another embodiment of a portion of a hydraulic control system according to the principles of the present invention.

With reference to FIG. 3, another embodiment of the hydraulic control system is generally indicated by reference number 300. The hydraulic control system 300 is similar to the hydraulic control system 100 shown in FIG. 1 and like components are indicated by like reference numbers. However, the latching mechanism 174 and the control devices 124 and 126 shown in FIG. 1 have been replaced with a stepper motor 302 and a return valve assembly 304. The stepper motor 302 is mechanically connected to the spool 160 and is operable to stroke and de-stroke the spool 160 between the various positions.

The return valve assembly 304 is operable to stroke the spool 160, and reset the stepper motor 302, in the event of power failure or stepper motor failure. The return valve assembly 304 includes ports 304A-E. Port 304A is an exhaust port in communication with the sump 114. Ports 304B and D are in communication with a fluid line 306 which communicates with port 128B of the mode valve assembly 128. Port 304C communicates with the main supply line 112. Port 304E communicates with a solenoid 308.

The return valve assembly 304 includes further includes a spool 310 slidably disposed within a bore 312. The spool 310 is actuated by the solenoid 308 and by a spring 314. For example, when solenoid 308 is opened, fluid communicates through port 304E and moves the spool 310 against the bias of the spring 314 (i.e. stroked to the left). In the stroked position, port 304C is closed and port 304B exhausts through port 304A, thereby not controlling the spool 160. When the solenoid 308 is closed, the spool 304 de-strokes and fluid at line pressure from port 304C communicates through port 304B to fluid line 306 and into the mode valve assembly 128. The fluid communicates through port 128B and engages the spool 160, stroking the spool 160 against the bias of the spring 164 and in turn moving the stepper motor 302.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission, the transmission having a Park mode and an Out of Park mode of operation, the transmission having a plurality of torque transmitting devices selectively engageable to provide at least one forward speed ratio and at least one reverse speed ratio when in the Out of Park mode of operation, the hydraulic control system comprising:
    a pressure regulator subsystem for providing a pressurized hydraulic fluid;
    a clutch actuator subsystem for selectively actuating the torque transmitting devices upon receipt of the pressurized hydraulic fluid;
    a manual valve assembly in downstream fluid communication with the pressure regulator subsystem and in upstream fluid communication with the clutch actuator subsystem, the manual valve assembly having a manual valve moveable between a Park position and an Out of Park position;
    a detent mechanism connected to the manual valve, wherein the detent mechanism detents the manual valve into the Out of Park position;
    a latch valve assembly in downstream fluid communication with the pressure regulator subsystem and the manual valve assembly, the latch valve assembly having a latch valve moveable between a Park position and an Out of Park position;
    a park servo in downstream fluid communication with the latch valve assembly and the manual valve assembly; and
    a park lock mechanism mechanically coupled to the park servo, wherein the park servo mechanically moves the park lock mechanism to place the transmission in the Park condition when the manual valve and the latch valve are in the Park positions and wherein the park servo mechanically moves the park lock mechanism to place the transmission in the Out of Park condition when the manual valve and the latch valve are in the Out of Park positions.

2. The hydraulic control system of claim 1 further comprising a first control device in downstream fluid communication with the pressure regulator subsystem and in upstream fluid communication with the manual valve assembly, wherein the first control device when opened communicates the pressurized hydraulic fluid to the manual valve assembly to move the manual valve to the Out of Park position.

3. The hydraulic control system of claim 2 further comprising a second control device in downstream fluid communication with the pressure regulator subsystem and in upstream fluid communication with the manual valve assembly, wherein the second control device when opened communicates the pressurized hydraulic fluid to the manual valve assembly to move the manual valve to the Park position.

4. The hydraulic control system of claim 1 further comprising a third control device mechanically coupled to the manual valve and the park servo, wherein the third control device when opened locks the manual valve and the park servo into the Out of Park positions.

5. The hydraulic control system of claim 1 wherein the detent mechanism includes a ball biased towards the manual valve by a spring.

6. The hydraulic control system of claim 5 wherein the manual valve includes a stem that extends out of the manual valve assembly, and the stem includes a slot that aligns with the detent mechanism when the manual valve is in the Out of Park position.

7. The hydraulic control system of claim 6 further comprising a sensor connected to the manual valve for sensing a position of the manual valve.

8. The hydraulic control system of claim 1 wherein the detent mechanism includes a ball selectively biased towards the manual valve by a hydraulically actuated piston.

9. The hydraulic control system of claim 8 wherein the piston is in downstream fluid communication with the clutch actuator subsystem.

10. A hydraulic control system for a transmission, the transmission having a Park mode and an Out of Park mode of operation, the transmission having a plurality of torque transmitting devices selectively engageable to provide at least one forward speed ratio and at least one reverse speed ratio when in the Out of Park mode of operation, the hydraulic control system comprising:
   a pressure regulator subsystem for providing a pressurized hydraulic fluid;
   a manual valve assembly having a first port in communication with the pressure regulator subsystem, a second port in communication with a Reverse circuit, a third port in communication with a Drive circuit, and a fourth port, the manual valve assembly having a manual valve moveable between a Park position and an Out of Park position;
   a detent mechanism connected to the manual valve, wherein the detent mechanism detents the manual valve into the Out of Park position;
   a latch valve assembly having a first port in communication with the pressure regulator subsystem, a second port in communication with the fourth port of the manual valve assembly, and a third port, the latch valve assembly having a latch valve moveable between a Park position and an Out of Park position;
   a park servo in downstream fluid communication with the third port of the latch valve assembly and the fourth port of the manual valve assembly; and
   a park lock mechanism mechanically coupled to the park servo, wherein the park servo mechanically moves the park lock mechanism to place the transmission in the Park condition when the manual valve and the latch valve are in the Park positions and wherein the park servo mechanically moves the park lock mechanism to place the transmission in the Out of Park condition when the manual valve and the latch valve are in the Out of Park positions.

11. The hydraulic control system of claim 10 wherein the first port of the manual valve assembly is in communication with the second, third, and fourth ports of the manual valve assembly when the manual valve is in the Out of Park position.

12. The hydraulic control system of claim 11 wherein the first port of the latch valve assembly is in communication with the second port of the latch valve assembly when the latch valve is in the Park position.

13. The hydraulic control system of claim 12 wherein the manual valve assembly includes a fifth port and a sixth port that each communicate with opposite control surfaces of the manual valve.

14. The hydraulic control system of claim 13 further comprising a first control device in downstream fluid communication with the pressure regulator subsystem and in upstream fluid communication with the fifth port of the manual valve assembly, wherein the first control device when opened communicates the pressurized hydraulic fluid to the fifth port of the manual valve assembly to move the manual valve to the Out of Park position.

15. The hydraulic control system of claim 14 further comprising a second control device in downstream fluid communication with the pressure regulator subsystem and in upstream fluid communication with the sixth port of the manual valve assembly, wherein the second control device when opened communicates the pressurized hydraulic fluid to the sixth port of the manual valve assembly to move the manual valve to the Park position.

16. The hydraulic control system of claim 15 further comprising a third control device mechanically coupled to the manual valve and the park servo, wherein the third control device when opened locks the manual valve and the park servo into the Out of Park positions.

17. The hydraulic control system of claim 16 wherein the first control devices is a normally low flow control solenoid and the second control device is a normally low pressure control solenoid.

18. The hydraulic control system of claim 10 wherein the detent mechanism includes a ball biased towards the manual valve by a spring.

19. The hydraulic control system of claim 18 wherein the manual valve includes a stem that extends out of the manual valve assembly, and the stem includes a slot that aligns with the detent mechanism when the manual valve is in the Out of Park position.

20. The hydraulic control system of claim 10 wherein the detent mechanism includes a ball selectively biased towards the manual valve by a hydraulically actuated piston and the piston is in downstream fluid communication with the clutch actuator subsystem.

* * * * *